United States Patent
Pianigiani et al.

(10) Patent No.: US 11,316,738 B2
(45) Date of Patent: Apr. 26, 2022

(54) VENDOR AGNOSTIC PROFILE-BASED MODELING OF SERVICE ACCESS ENDPOINTS IN A MULTITENANT ENVIRONMENT

(71) Applicant: Juniper Networks, Inc., Sunnyvale, CA (US)

(72) Inventors: Jacopo Pianigiani, Cupertino, CA (US); Atul S Moghe, San Jose, CA (US); Ankur Tandon, Sunnyvale, CA (US); Supriya Sridhar, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/588,699

(22) Filed: Sep. 30, 2019

(65) Prior Publication Data
US 2021/0058295 A1 Feb. 25, 2021

Related U.S. Application Data

(60) Provisional application No. 62/888,958, filed on Aug. 19, 2019.

(51) Int. Cl.
*H04L 12/24* (2006.01)
*H04L 41/0866* (2022.01)
(Continued)

(52) U.S. Cl.
CPC ........ *H04L 41/0866* (2013.01); *G06F 9/4416* (2013.01); *H04L 41/082* (2013.01); *H04L 67/303* (2013.01); *H04L 45/64* (2013.01)

(58) Field of Classification Search
CPC . H04L 41/0866; H04L 41/082; H04L 67/303; H04L 45/64; G06F 9/4416
See application file for complete search history.

(56) References Cited

U.S. PATENT DOCUMENTS 9,094,299 B1 * 7/2015 Rao D.S. ............ H04L 41/0803
10,291,497 B2 5/2019 Mehta et al.
(Continued)

FOREIGN PATENT DOCUMENTS

EP 2875609 A1 5/2015
WO 2013184846 A1 12/2013

OTHER PUBLICATIONS

Extended Search Report from counterpart European Application No. 19218718.5, dated Jun. 29, 2020, 9 pp.
(Continued)

*Primary Examiner* — Gil H. Lee
*Assistant Examiner* — Juan C Turriate Gastulo
(74) *Attorney, Agent, or Firm* — Shumaker & Sieffert, P.A.

(57) ABSTRACT

An access profile includes configuration characteristics that are defined using device and operating system agnostic attributes. Thus, the access profiles are not necessarily dependent or otherwise tied to any particular vendor or network OS. When a system administrator configures one or more service access points, the system administrator need only specify the vendor and network OS agnostic characteristics that are to be associated with the service access point. A configuration generator can generate vendor specific and/or network specific configuration commands and data from the vendor and network OS agnostic access profile attributes. The generated configuration commands and data can be provided to a network device hosting the service access point using a vendor specific and/or network OS specific configuration application program interface.

20 Claims, 5 Drawing Sheets

(51) Int. Cl.
    *G06F 9/4401*     (2018.01)
    *H04L 41/082*     (2022.01)
    *H04L 67/303*     (2022.01)
    *H04L 45/64*     (2022.01)

(56) References Cited

U.S. PATENT DOCUMENTS

| | | | | |
|---|---|---|---|---|
| 2002/0147828 | A1* | 10/2002 | Chen | H04W 28/24 |
| | | | | 709/231 |
| 2003/0135596 | A1* | 7/2003 | Moyer | H04L 41/022 |
| | | | | 709/223 |
| 2003/0220986 | A1* | 11/2003 | Thakor | H04L 41/0843 |
| | | | | 709/220 |
| 2006/0242690 | A1* | 10/2006 | Wolf | H04L 41/0893 |
| | | | | 726/6 |
| 2015/0066560 | A1 | 3/2015 | Madani et al. | |
| 2016/0294611 | A1* | 10/2016 | Khambatkone | H04L 41/0803 |
| 2017/0187607 | A1* | 6/2017 | Shaikh | H04L 41/042 |
| 2020/0067851 | A1* | 2/2020 | Yigit | H04L 45/02 |

OTHER PUBLICATIONS

Hopps, "Analysis of an Equal-Cost Multi-Path Algorithm," RFC 2992, Network Working Group, Nov. 2000, 8 pp.
Response to European Communication Pursuant to Rule 69 EPC dated Mar. 1, 2021, from counterpart European application No. 19218718.5, filed Aug. 24, 2021, 26 pp.

\* cited by examiner

VENDOR AGNOSTIC PROFILE-BASED MODELING OF SERVICE ACCESS ENDPOINTS IN A MULTITENANT ENVIRONMENT

This application claims the priority benefit of U.S. Provisional Patent Application Ser. No. 62/888,958, filed Aug. 19, 2019, the entire contents of which is incorporated herein by reference.

TECHNICAL FIELD

The disclosure relates to computer networks and, more particularly, to configuring network devices and servers.

BACKGROUND

In a typical cloud data center environment, a large collection of interconnected servers provides computing (e.g., compute nodes) and/or storage capacity to run various applications. For example, a data center comprises a facility that hosts applications and services for customers of the data center. The data center, for example, hosts all the infrastructure equipment, such as networking and storage systems, redundant power supplies, and environmental controls. In a typical data center, clusters of storage systems and application servers are interconnected via a high-speed switch fabric provided by one or more tiers of physical network switches and routers.

A typical data center can include hundreds of physical network switches and thousands of storage and application servers. These devices within the data center are typically provided by many different vendors and manufacturers, and thus have varying hardware and software configuration requirements and interfaces. Even within a particular product line of a manufacturer, there can be different hardware configurations and different network operating systems (OSs) that utilize different configuration interfaces. For example, a switch in a particular product line may have different chip sets from another switch in the same product line depending on the model and version of the switch hardware. In view of the foregoing, a typical data center may utilize many different configuration interfaces for the potentially thousands of network devices in the data center.

SUMMARY

Network devices from different vendors running different network operating systems can be configured using vendor agnostic, device agnostic, and network operating system (OS) agnostic configuration profiles, referred to as access profiles. The vendor, device and network OS agnostic access profiles may specify various network operation characteristics using attributes that are not tied to any particular vendor's or device's configuration interface or network OS. The attributes that are available for use in an access profile can be selected to represent a uniform set of different characteristics or features for modelling the intent of a system administrator with respect to configuring a service access point. This is in contrast to conventional systems that typically force the user to use numerous different configuration commands and parameters that may be specific to a vendor, device or network OS. Thus, the access profiles are not necessarily dependent or otherwise tied to any particular vendor or network OS. When a system administrator configures one or more service access points, the system administrator need only specify the vendor, device and network OS agnostic characteristics that are to be associated with the service access point. A configuration generator can generate vendor specific, device specific and/or network OS specific configuration commands and data from the vendor, device and network OS agnostic access profile attributes. The generated device specific configuration commands and data (e.g., parameters) can be provided to a network device hosting the service access point using a vendor specific and/or network OS specific configuration API.

In one example aspect, a method includes obtaining hardware configuration information for each of a plurality of network devices; receiving an indication of a selection of a service access point of a first network device of the plurality of network devices; receiving an indication of a selection of a device agnostic service characteristic; associating an access profile with the selected service access point in accordance with the device agnostic service characteristic, the access profile having one or more device agnostic attributes defining the selected device agnostic service characteristic; and determining, based at least in part on the one or more device agnostic attributes of the access profile associated with the selected service access point, one or more device specific configuration commands and configuration parameters that conform with a first configuration interface of the first network device.

In another example aspect, a Software Defined Network (SDN) controller includes one or more processors coupled to a memory, the memory including executable instructions to cause the one or more processors to: obtain hardware configuration information for each of a plurality of network devices on a network controlled in part by the SDN controller; receive an indication of a selection of a service access point of a first network device of the plurality of network devices; receive an indication of a selection of a device agnostic service characteristic; associate an access profile with the selected service access point in accordance with the device agnostic service characteristic, the access profile having one or more device agnostic attributes defining the selected device agnostic service characteristic; and determine, based at least in part on the one or more device agnostic attributes of the access profile associated with the selected service access point, one or more device specific configuration commands and configuration parameters that conform with a first configuration interface of the first network device.

In a further example aspect, a computer-readable medium includes instructions for causing one or more programmable processors to: obtain hardware configuration information for each of a plurality of network devices on a network controlled in part by the SDN controller; receive an indication of a selection of a service access point of a first network device of the plurality of network devices; receive an indication of a selection of a device agnostic service characteristic; associate an access profile with the selected service access point in accordance with the device agnostic service characteristic, the access profile having one or more device agnostic attributes defining the selected device agnostic service characteristic; determine, based at least in part on the one or more device agnostic attributes of the access profile associated with the selected service access point, one or more device specific configuration commands and configuration parameters that conform with a first configuration interface of the first network device; and provide the one or more device specific configuration commands and configuration parameters to the first network device via the first configuration interface.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the text and figures.

DETAILED DESCRIPTION

Figure 1:
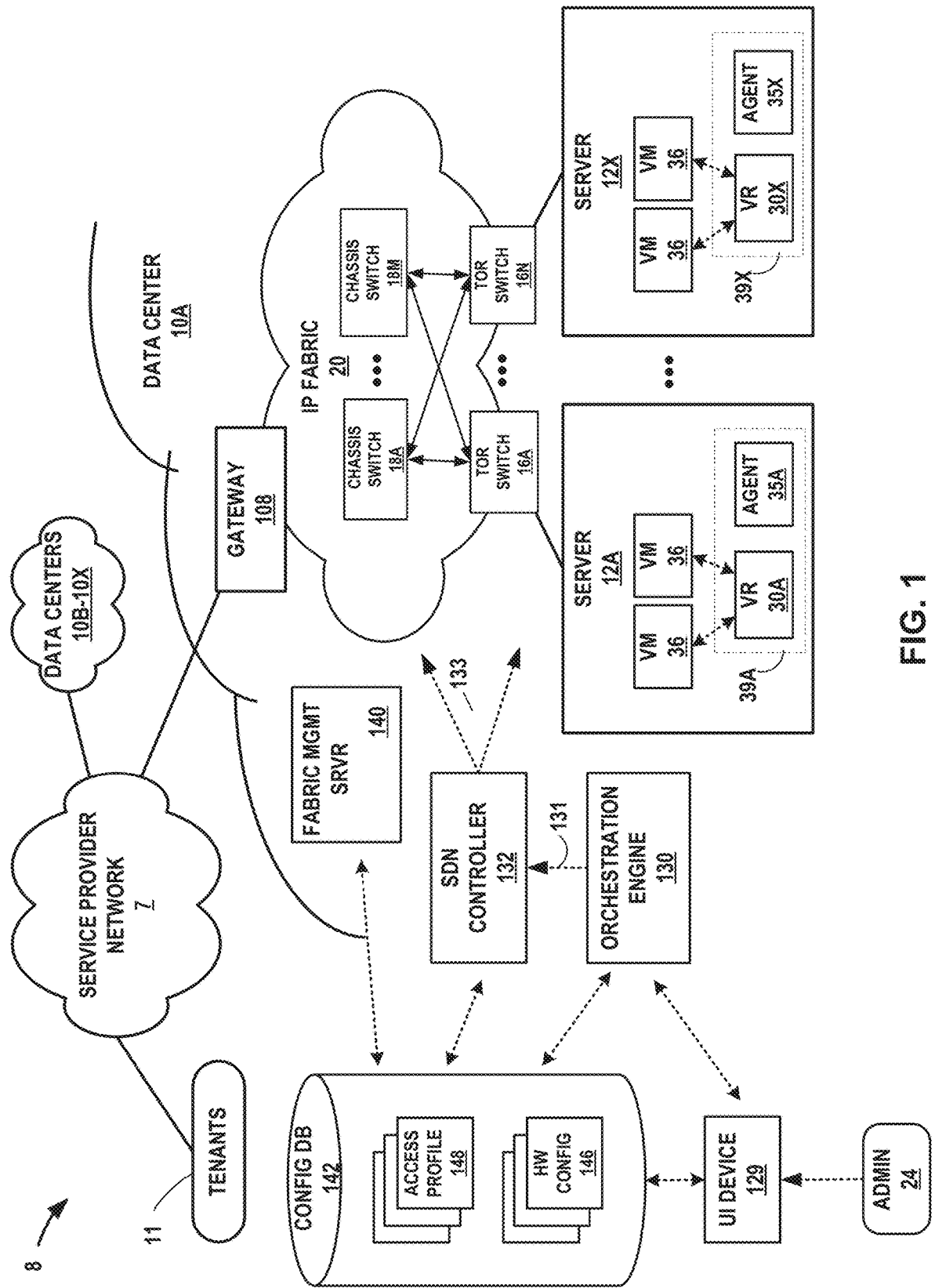
FIG. 1 is a block diagram illustrating an example computer network system in accordance with techniques described herein.

FIG. 1 is a block diagram illustrating an example computer network system 8 in accordance with techniques described herein. The example computer network system 8 can be configured using the techniques described below with respect to FIGS. 2-5.

Computer network system 8 in the example of FIG. 1 includes data centers 10A-10X (collectively, "data centers 10") interconnected with one another and with customer networks associated with tenants 11 via a service provider network 7. Any or all of data centers 10A-10X may be a multi-tenant data center. A multi-tenant data center provides services to multiple customers (i.e., tenants).

FIG. 1 illustrates one example implementation of computer network system 8 and a data center 10A that hosts one or more cloud-based computing networks, computing domains or projects, generally referred to herein as cloud computing cluster. The cloud-based computing clusters may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of computer network system 8 and data center 10A may be appropriate in other instances. Such implementations may include a subset of the components included in the example of FIG. 1 and/or may include additional components not shown in FIG. 1. Data centers 10B-10X may include the same or similar features and be configured to perform the same or similar functions as described herein with respect to data center 10A.

In the example shown in FIG. 1, data center 10A provides an operating environment for applications and services for tenants 11 coupled to data center 10A by service provider network 7 through gateway 108. Although functions and operations described in connection with computer network system 8 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 10A hosts infrastructure equipment, such as networking and storage systems, redundant power supplies, and environmental controls. Service provider network 7 may be coupled to one or more networks administered by other providers and may thus form part of a large-scale public network infrastructure, e.g., the Internet. In some examples, data center 10A may represent one of many geographically distributed network data centers. As illustrated in the example of FIG. 1, data center 10A is a facility that provides network services for tenants 11. Tenants 11 may be collective entities such as enterprises and governments or individuals. For example, data center 10A may host web services for several enterprises and end users and thus may be referred to as a multi-tenant data center. Other exemplary services may include data storage, virtual private networks, traffic engineering, file service, data mining, scientific, or super-computing, and so on. In some examples, data center 10A is an individual network server, a network peer, or otherwise that may provide services to multiple enterprises and end users.

In the example of FIG. 1, data center 10A includes a set of storage systems and application servers, including server 12A through server 12X (collectively "servers 12") interconnected via high-speed switch fabric 20 provided by one or more tiers of physical network switches and routers. Servers 12 function as physical compute nodes of the data center. For example, each of servers 12 may provide an operating environment for execution of one or more application workloads. As described herein, the terms "application workloads" or "workloads" may be used interchangeably to refer to application workloads. Workloads may execute on a virtualized environment, such as a virtual machine 36, a container, or some of type of virtualized instance, or in some cases on a bare metal server that executes the workloads directly rather than indirectly in a virtualized environment. Each of servers 12 may be alternatively referred to as a host computing device or, more simply, as a host. A server 12 may execute one or more of workloads on one or more virtualized instances, such as virtual machines 36, containers, or other virtual execution environment for running one or more services (such as virtualized network functions (VNFs)). Some or all of the servers 12 can be bare metal servers (BMS). A BMS can be a physical server that is dedicated to a specific tenant (i.e., customer).

Switch fabric 20 may include top-of-rack (TOR) switches 16A-16N coupled to a distribution layer of chassis switches 18A-18M, and data center 10A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A includes servers 12A-12X interconnected via the high-speed switch fabric 20 provided by one or more tiers of physical network switches and routers. Switch fabric 20 is provided by the set of interconnected TOR switches 16A-16N (collectively, "TOR switches 16") coupled to the distribution layer of chassis switches 18A-18M (collectively, "chassis switches 18"). In some examples, chassis switches 18 may operate as spine nodes and TOR switches 16 may operate as leaf nodes in data center 10A. Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to gateway 108 and service provider network 7. Chassis switches 18 aggregate traffic flows and provide high-speed connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to gateway 108, which may perform layer 3 routing to route network traffic between data center 10A and tenants 11 by service provider network 7.

Switch fabric 20 may perform layer 3 routing to route network traffic between data center 10A and tenants 11 by service provider network 7. Gateway 108 acts to forward and receive packets between switch fabric 20 and service provider network 7. Data center 10A includes an overlay network that extends switch fabric 20 from physical switches 18, 16 to software or "virtual" switches. For example, virtual routers 30A-30X located in servers 12A-12X, respectively, may extend the switch fabric 20 by communicatively coupling with one or more of the physical switches located within the switch fabric 20. Virtual switches may dynamically create and manage one or more virtual networks usable for communication between application instances. In one example, virtual routers 30A-30X execute the virtual network as an overlay network, which provides the capability to decouple an application's virtual address from a physical address (e.g., IP address) of the one of servers 12A-12X on which the application is executing. Each virtual network may use its own addressing and security scheme and may be viewed as orthogonal from the physical network and its addressing scheme. Various techniques may be used to transport packets within and across virtual network(s) over the physical network.

Software-Defined Networking ("SDN") controller 132 provides a logically and in some cases physically centralized controller for facilitating operation of one or more virtual networks within data center 10A in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via a northbound API 131, which in turn operates in response to configuration input received from an administrator 24 operating user interface device 129. The administrator may be a fabric administrator responsible for operation of the data center as a whole or may be a system administrator for a tenant of the data center. In this case, the system administrator may have visibility to service access points for network devices assigned to the tenant and may not be able to see or otherwise interact with network devices assigned to a different tenant.

In some aspects, the SDN controller 132 may be part of a high availability (HA) cluster and provide HA cluster configuration services. Additional information regarding SDN controller 132 operating in conjunction with other devices of data center 10A or other software-defined networks is found in International Application Number PCT/US2013/044378, filed Jun. 5, 2013, and entitled "PHYSICAL PATH DETERMINATION FOR VIRTUAL NETWORK PACKET FLOWS," and in U.S. patent application Ser. No. 15/476,136, filed Mar. 31, 2017 and entitled, "SESSION-BASED TRAFFIC STATISTICS LOGGING FOR VIRTUAL ROUTERS," wherein both applications are incorporated by reference in their entirety as if fully set forth herein.

For example, SDN platforms may be used in data center 10 to control and manage network behavior. In some cases, an SDN platform includes a logically centralized and physically distributed SDN controller, such as SDN controller 132, and a distributed forwarding plane in the form of virtual routers that extend the network from physical routers and switches in the data center switch fabric into a virtual overlay network hosted in virtualized servers.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. One such communication protocol may include a messaging communications protocol such as XMPP, for example. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a virtualized environment. SDN controller 132 maintains routing, networking, and configuration information within a state database. SDN controller 132 communicates a suitable subset of the routing information and configuration information from the state database to virtual router (VR) 30A-30X or agents 35A-35X ("AGENT" in FIG. 1) on each of servers 12A-12X.

As described herein, each of servers 12 include a respective forwarding component 39A-39X (hereinafter, "forwarding components 39) that performs data forwarding and traffic statistics collection functions for workloads executing on each server 12. In the example of FIG. 1, each forwarding component is described as including a virtual router ("VR 30A-VR 30X" in FIG. 1) to perform packet routing and overlay functions, and a VR agent ("VA 35A-35X" in FIG. 1) to communicate with SDN controller 132 and, in response, configure the virtual routers 30.

In this example, each virtual router 30A-30X implements at least one routing instance for corresponding virtual networks within data center 10 and routes the packets to appropriate virtual machines, containers, or other elements executing within the operating environment provided by the servers. Packets received by the virtual router of server 12A, for instance, from the underlying physical network fabric may include an outer header to allow the physical network fabric to tunnel the payload or "inner packet" to a physical network address for a network interface of server 12A that executes the virtual router. The outer header may include not only the physical network address of the network interface of the server but also a virtual network identifier such as a Virtual Extensible Local Area Network (VxLAN) tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In the example of FIG. 1, SDN controller 132 learns and distributes routing and other information (such as configuration) to all compute nodes in the data center 10. The VR agent 35 of a forwarding component 39 running inside the compute node, upon receiving the routing information from SDN controller 132, typically programs the data forwarding element (virtual router 30) with the forwarding information. SDN controller 132 sends routing and configuration information to the VR agent 35 using a messaging communications protocol such as XMPP protocol semantics rather than using a more heavy-weight protocol such as a routing protocol like BGP. In XMPP, SDN controller 132 and agents communicate routes and configuration over the same channel. SDN controller 132 acts as a messaging communications protocol client when receiving routes from a VR agent 35, and the VR agent 35 acts as a messaging communications protocol server in that case. Conversely, SDN controller 132 acts as a messaging communications protocol server to the VR agent 35 as the messaging communications protocol client when the SDN controller sends routes to the VR agent 35. SDN controller 132 may send security policies to VR agents 35 for application by virtual routers 30.

User interface device 129 may be implemented as any suitable computing system, such as a mobile or non-mobile computing device operated by a user and/or by administrator 24. User interface device 129 may, for example, represent a workstation, a laptop or notebook computer, a desktop computer, a tablet computer, smartphone or any other computing device that may be operated by a user and/or present a user interface in accordance with one or more aspects of the present disclosure.

In some examples, orchestration engine 130 manages functions of data center 10A such as compute, storage, networking, and application resources. For example, orchestration engine 130 may create a virtual network for a tenant (i.e., customer) within data center 10A or across data centers. Orchestration engine 130 may attach workloads (WLs) to a tenant's virtual network. Orchestration engine 130 may connect a tenant's virtual network to an external network, e.g. the Internet or a VPN. Orchestration engine 130 may implement a security policy across a group of workloads or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 12 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches 16, chassis switches 18, and switch fabric 20; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 20 or between servers 12 and tenants 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular traffic flow over a single deterministic path.

Virtual routers (virtual router 30A to virtual router 30X, collectively "virtual routers 30" in FIG. 1) execute multiple routing instances for corresponding virtual networks within data center 10A and routes the packets to appropriate workload executing within the operating environment provided by servers 12. Each of servers 12 may include a virtual router. Packets received by virtual router 30A of server 12A, for instance, from the underlying physical network fabric may include an outer header to allow the physical network fabric to tunnel the payload or "inner packet" to a physical network address for a network interface of server 12A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

The above-described physical and virtual resources (servers, switches, virtual routers etc.) may be allocated to tenants 11 for their exclusive or shared use. The allocation of resources to particular tenants may be directed by an administrator 24 (e.g., a fabric administrator) operating UI device 129. Data center 10A can have thousands of chassis switches 18 and TOR switches 16, and hundreds of servers 12. These network devices can include varying models of devices from the same manufacturer and devices from numerous different manufacturers. Further, the devices may be running a variety of network operating systems (OSs). A technical problem in this heterogenous data center environment is that conventional systems do not provide any way for an administrator to utilize a consistent interface to configure devices from different manufacturers and running different network OSs so that the configuration represents the intent of the administrator with respect to the overall configuration of the data center. Instead, the administrator must typically utilize numerous different interfaces that may be specific to the manufacturer, model and network OS of a device being configured in order to configure the device. As a result, an administrator may need to utilize numerous different interfaces and commands to configure the network devices in a data center. The variety of different configuration interfaces can be challenging for an administrator and can thus lead to a technical problem of erroneous configuration of devices such that devices in a data center 10A may not efficiently communicate with one another or may not communicate at all.

A practical application of the techniques described above and in further detail below is that network devices from different vendors and with differing hardware configurations and network OSs can be configured using a vendor agnostic, device agnostic and operating system agnostic configuration interface. The reduction of effort and expertise required for configuring the various devices in data center is an advantage that some examples can provide over previous provisioning methodology and may further provide advantages through error avoidance and increased network scalability.

In some aspects, the fabric management server 140 may discover network devices and obtain hardware configuration information 146 from the network devices. The hardware configuration information 146 may be maintained in a configuration database 142. The hardware configuration information 146 can include the number and types of network devices in a data center 10A. Further, the hardware configuration information 146 can include hardware manufacturer information (e.g., product make and model, version identifiers, revision levels, serial numbers etc.), network interface information (e.g., make, model, network type, supported protocols, communication speed etc.), available storage, processor types and other information regarding the hardware and components of a network device such as a switch, router, or server. The hardware configuration information can include information about chipsets that may be used on a particular network device. In addition, configuration database 142 may maintain other configuration or operational data. The hardware configuration information 146 may be organized according to the data model described below with respect to FIG. 4.

UI device 129 can be used (e.g., by an administrator 24) to assign access profiles 148 to service access endpoints in the data center. Such service access endpoints can be virtual interfaces that are backed by physical ports or network interfaces of switches, routers, and servers inventoried and described in the hardware configuration information 146 for a data center 10A. As an example, a service access point may be an interface from a network device to a Virtual Local Area Network (VLAN) in an Ethernet Virtual Private Network (EVPN) VXLAN of a data center. A tenant may receive various communication and application services via the service access endpoint.

An access profile 148 can include data that describes service characteristics of a service access endpoint in a vendor agnostic, device agnostic, and operating system agnostic manner. The term device agnostic will be used to describe characteristics, attributed, commands or parameters that may be vendor agnostic, device agnostic and/or network OS agnostic. In other words, the device agnostic service characteristics described in an access profile 148 are not necessarily tied to any particular vendor, network device, or network operating system. Such characteristics may include Class of Service (CoS) characteristics, communication speed and bandwidth characteristics, and communication protocol characteristics. In some aspects, an access profile 148 can include device agnostic service characteristics of an aggregate of features provided by different hardware vendors, software vendors, network OSs etc. that can be specified as part of an access endpoint configuration. The parameters associated with the device agnostic service may differ from one access profile to another based on the configuration intent of the user. As but one example, a first access profile may be associated with a user intent to provide a high Quality of Service (QoS) via a service access endpoint, while a second access profile may be associated with a user intent to provide a lower QoS. In this example, the device agnostic service characteristics may include one or more attributes that define a high QoS. The attributes can also be expressed in a device agnostic manner and can thus be referred to as device agnostic attributes. As an example, attributes associated with a high QoS include high bandwidth and low latency. Thus, the device agnostic service characteristic for high QoS may include attributes specifying a high bandwidth value and a low latency value. The access profiles 148 can have names, labels or other identifier that uniquely identify an access profile.

The access profiles 148 and their respective network device and port assignments may be maintained in configuration database 142. For example, a user interface available in UI device 129 can provide identifiers for the network devices and hardware discovered in data center 10A. Further, the user interface device 129 can provide a user interface for assigning access profiles 148 to the discovered network devices and ports inventoried and described in hardware configuration information 146. Although shown as being in a single configuration database 142, hardware configuration 146 and access profiles 148 may be maintained in separate databases.

Figure 2:
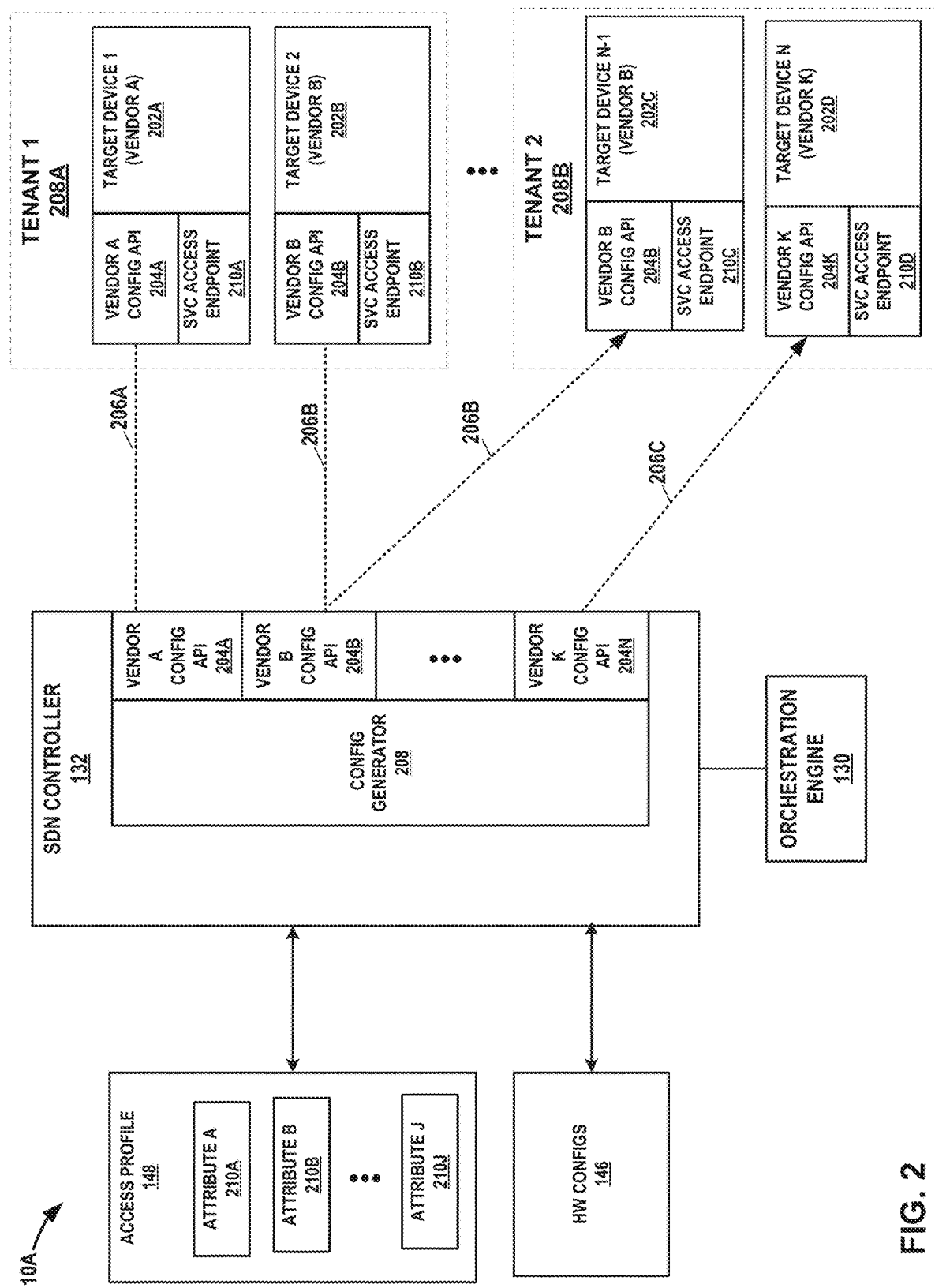
FIG. 2 is a block diagram providing further details of an example SDN controller in the example computer network system of FIG. 1 in further detail.

FIG. 2 is a block diagram providing further details of an example SDN controller 132 for configuring target network devices 202 according to techniques disclosed herein. The target network devices 202 (e.g., 202A-202D) can be network devices that are being configured as part of a configuration of a new data center, they can be network devices that are being configured as a result of adding tenants to an existing data center, or they can be target network devices already allocated to tenants that are being reconfigured. The techniques described herein are not limited to any particular configuration purpose. A network device may be referred to as a target network device when the network device is a target of configuration commands and data. In some aspects, the target network device can be a physical device such as a physical switch, router, or server. In some aspects, the target network device can be a virtual device such as a virtual machine, a virtual server, a virtual router, a VLAN interface, cloud based virtual machine, or other virtual device. In some aspects, SDN controller 132 may include a configuration generator 208 that may generate device specific configuration commands and data (e.g., parameters) that may be used to configure network devices 202 in data center 10A. In the example illustrated in FIG. 2, two tenants 208 (208A and 208B) are allocated target network devices 202 from n network devices in data center 10A. The target network devices 202 may be sourced from any of a number of k vendors, labeled as vendors A-K in FIG. 2. Thus, in the example illustrated in FIG. 2, tenant 208A has two target network devices 202A and 202B allocated for its use, and tenant 208B has two target network devices 202C and 202D allocated for its use. Target network device 202A is from vendor A, target network devices 202B and 202C are provided by vendor B, and target network device 202D is provided by vendor K. The target network devices 202 may be different types, models, versions etc. from one another and may be running different network OSs from one another. For the purposes of illustrating aspects of the disclosure, it will be assumed that target network device 202B and target network device 202C are from the same vendor, are the same device type, at the same version and have the same network OS running on them.

In the example illustrated in FIG. 2, the network devices have an access endpoint 210 (e.g., 210A-210D). An access endpoint 210 can be a network port, line card network interface etc. Although only one access endpoint is shown for each of the devices 202, a network device 202 can have more than one access endpoint 210. Further, the network devices have each implemented a vendor specific configuration Application Programming Interface (API) 204. Target network device 202A implements configuration API 204A. Because target network device 202B and target network device 202C are from the same vendor, are the same device type, and have the same version and network OS running on them, they also may have the same configuration API 204B. Target network device 202D may implement configuration API 204K.

Configuration generator 208 may also implement configuration APIs 204 that correspond to the configuration APIs in use in a data center. Thus, in the example illustrated in FIG. 2, configuration generator 208 implements configuration APIs 204A, 204B and 204K in order to communicate with the corresponding configuration APIs 204A, 204B and 204K on target network devices 202A-202D.

Configuration generator 208 may read hardware configuration information 146 and a vendor agnostic access profile 148 to determine vendor specific configuration data and commands to be used for configuration a network device 202. The access profile 148 may have various attributes 210 that include data that defines or specifies, in a vendor agnostic, device agnostic and network OS agnostic manner, characteristics and features that are to be used in configuring a target network device 202 that is associated with the access profile 248. The attributes that are available for use in an access profile 148 can be selected to represent different characteristics, features, and parameters for modelling the intent of a system administrator with respect to configuring a service access point, rather than vendor specific configuration commands and parameters. In some aspects, one or more of the attributes 210 may be related to CoS or QoS. For example, one or more of attributes 210 may specify to what extent, what CoS marking and shaping should be applied to the traffic generated at an access endpoint 210. In some aspects, one or more attributes 210 may specify how to limit Broadcast Unknown Unicast Multicast traffic in order to prevent network flooding or storms. For example, one or more attributes 210 may specify thresholds in terms of a bit rate or packet rate. Independent thresholds may be set for broadcast rate, multicast rate and unknown unicast rate. Other attributes 210 may be used to specify or define other desired service access endpoint characteristics.

In some aspects, the access profile may be organized as an eXtensible Markup Language (XML) file. However, other formats may be used and are within the scope of the disclosure.

An indication may be received that a target device 202 is to be configured. For example, orchestration engine 230 may indicate to SDN controller 132 that a target device 202 is to be configured. As another example, a user such as an administrator 24 may create or update an access profile 148 associated with a device 202. When a target device 202 is to be configured (or reconfigured), configuration generator 208 may read the hardware configuration information 146 associated with the target device 202 to determine a vendor associated with the target device 202, the device type of target device 202, and/or model information for the target device 202. The configuration generator may also read an access profile 148 associated with the target device 202 to obtain device agnostic, vendor agnostic and/or network OS agnostic information regarding the intended device agnostic service characteristics for the target device 202. Configuration generator 208 may use the hardware configuration information and the device agnostic attributes of the intended device agnostic service characteristics to generate device specific configuration commands and/or configuration data to be provided to the target device 202 via the vendor specific configuration API 204 appropriate to the device. As used herein, a device specific configuration command or configuration parameter refers to a configuration command or parameter that may be specific to a vendor, device, or network OS. In other words, a device specific configuration command or parameter may be particular to a particular vendor, device, class of devices, or network OS, and is thus may not agnostic with respect to the vendor of the device, the device itself, or a network OS running on the device.

SDN controller 132 may comprise one or more processors that execute software instructions, such as those used to define a software or computer program, stored to a computer-readable storage medium, such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, SDN controller 132 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

SDN controller 132 may be executed by one or more compute nodes, which may correspond to computing resources in any form. Each of the compute nodes may be a physical computing device or may be a component of a cloud computing system, server farm, and/or server cluster (or portion thereof) that provides services to client devices and other devices or systems. Accordingly, any of the compute nodes may represent physical computing devices, virtual computing devices, virtual machines, containers, and/or other virtualized computing device.

Figure 3:
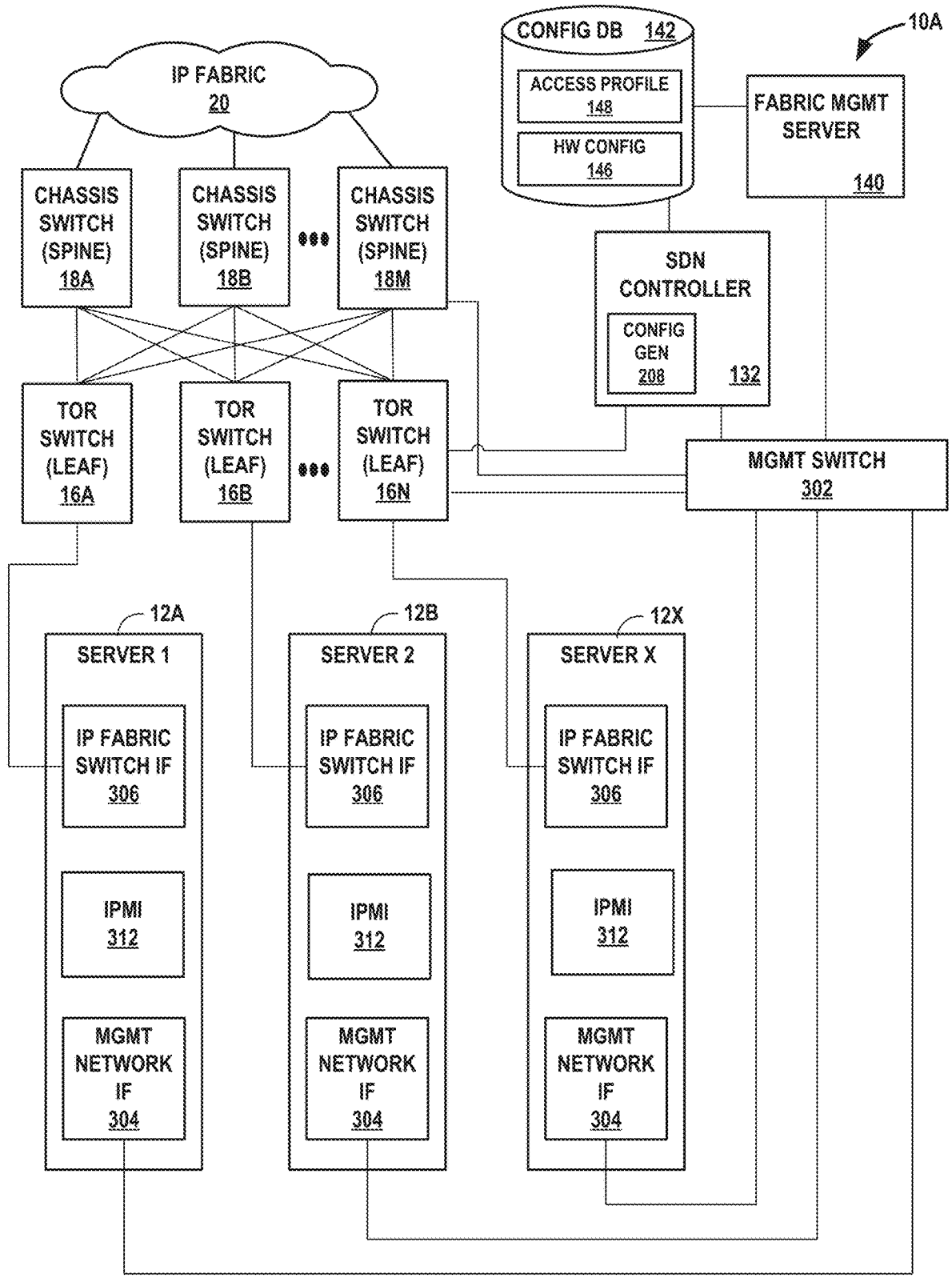
FIG. 3 is a block diagram illustrating an example implementation of a data center in the example computer network system of FIG. 1 in further detail.

FIG. 3 is a block diagram illustrating an example implementation of a data center in the example computer network system of FIG. 1 in further detail. In the example of FIG. 3, data center 10A includes a fabric management server 140 communicably coupled to a management switch 302. Other data center components such as SDN controller 132, servers 12, chassis switches 18 and TOR switches 16 may also be communicably coupled to the management switch 302. The management switch, server connections and switch connections to the management switch form an out-of-band management network.

Each of the servers 12 may include a management network interface 304, an IP fabric switch interface 306, and an Intelligent Platform Management Interface (IPMI) 312. Management network interface 304 provides a hardware and/or software interface that provides for communicating data between a server 12A-12X to the management switch 302. IP fabric switch interface 306 provides a hardware and/or software interface that provides for communicating data between a server 12A-12X to a TOR switch 16A-16N.

IPMI 312 provides an interface to a computing system (e.g., any of servers 12) that can be used to monitor and manage the operation of the computing system that is independent of the computing system's host processor(s) and operating system. For example, IPMI 312 can enable a system administrator to manage a computing system that is powered off, has not been completely configured or lacks the ability to function or communicate as intended.

Fabric management server 140 may control the execution of various discovery and configuration related workflows. As noted above, data collected, produced, and used by the fabric management server 140 may be maintained as hardware configuration information 146 in configuration database 142.

Configuration generator 208 can use the hardware configuration information 148 collected as described above along with access profiles 148 to configure some or all of chassis switches 18, TOR switches 16, and servers 12.

Figure 4:
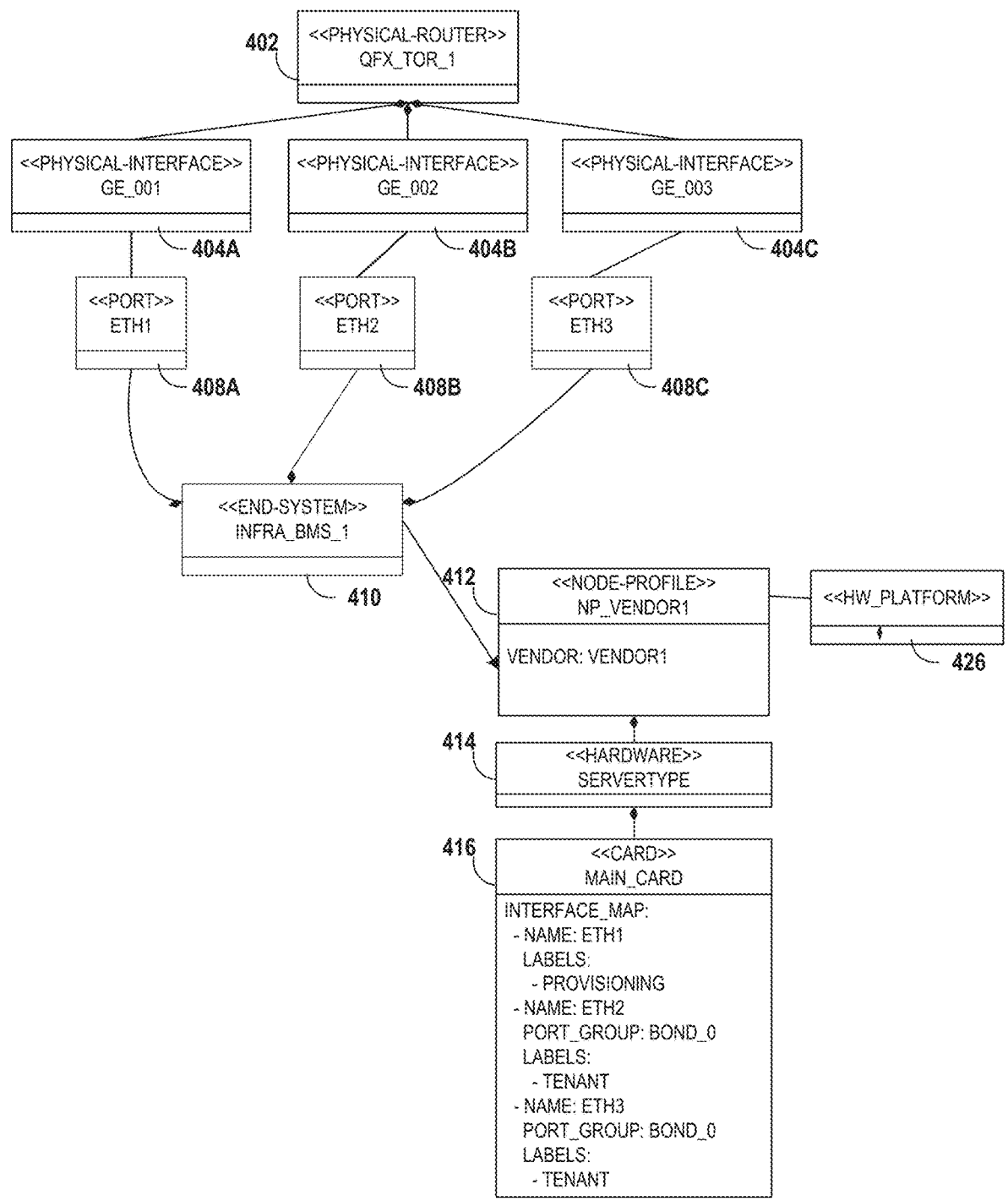
FIG. 4 is a block diagram illustrating network configuration data in accordance with techniques described herein.

FIG. 4 is a block diagram illustrating example network configuration data models in accordance with techniques described herein. The example network configuration data models can be used to specify data structures for data stored in a data store such as configuration database 142. The example network configuration data models presented in FIG. 4 can correspond with hardware configuration information 146 that is added as a result of discovery of network devices by fabric management server 140 assigned to the network devices.

In some aspects, network configuration data structures may be added as a result of the execution of IP fabric discovery workflows by fabric management server 140. After an IP fabric discovery workflow has been executed, configuration data regarding switches is learned by the fabric management server 140. In the example illustrated in FIG. 4, a physical router data structure 402 can include data regarding a particular TOR switch identified as "QFX_TOR_1." For example, QFX_TOR_1 may be an identifying label assigned to TOR switch 12A (FIG. 2). In addition, in the example illustrated in FIG. 4, fabric management server 140 has discovered three ports on the switch QFX_TOR_1 and in response creates physical interface data structures 404A, 404B and 404C to represent the physical ports GE_001, GE_002 and GE_003 on switch QFX_TOR_1. Data structures for logical interfaces (not shown) that may be associated with the physical interface data structures may also be created by the fabric management server 140.

FIG. 4 further illustrates example network configuration data structures that can be added as a result of execution of server discovery workflows by fabric management server 140. The example data structures of FIG. 4 will be described with reference to a single discovered server (e.g., server 12A). Similar data structures could be added for other servers 12. In the example illustrated in FIG. 4, fabric management server 140 has discovered server 12A and created end-system data structure 410 to describe the server 12A. In this example, server 12A has been given the identifier of "INFRA_BMS_1." The fabric management server 140 has discovered that server 12A has three ports, and in response, can create three port data structures 408A, 408B and 408C to hold data describing the ports. In addition, fabric management server 140 has discovered that three ports are physically linked to three corresponding switch ports and creates references from each of the port data structures 408A-408C describing the three server 12A ports to the corresponding physical interface data structures 404A-404C describing the switch physical interfaces.

Additionally, server discovery workflows and IP fabric discovery workflows executed by fabric management server 140 may gather information that can be used to create or update node profile data structures 412-416. The node profile data structures 412-416 can describe aspects of the particular hardware associated with a server 12, or a switch described by physical router data structure 402 (e.g., chassis switch 18 or TOR switch 16). In the example illustrated in FIG. 4, a node-profile data structure 412 includes data identifying the vendor or manufacturer of the server (e.g., "vendor1") and the roles that can be supported by the server. A hardware data structure 414 can describe the particular type of server (e.g., "servertype"). For example, the type of server may identify a brand name or other label that identifies the type of server. A card data structure 416 can include data describing the network interface(s) available on the identified server.

The node profile data structure 412 may be linked with a hardware platform data structure 426. The hardware platform data structure 426 may include fields that identify a supported hardware platform for the node profile. For example, the hardware platform data structure 426 may include fields that identify the make/model of a server or physical router, the processor type of the server or physical router etc. The node profile 412 may be linked with data structures (not shown) that describe line cards and roles associated with the node.

Figure 5:
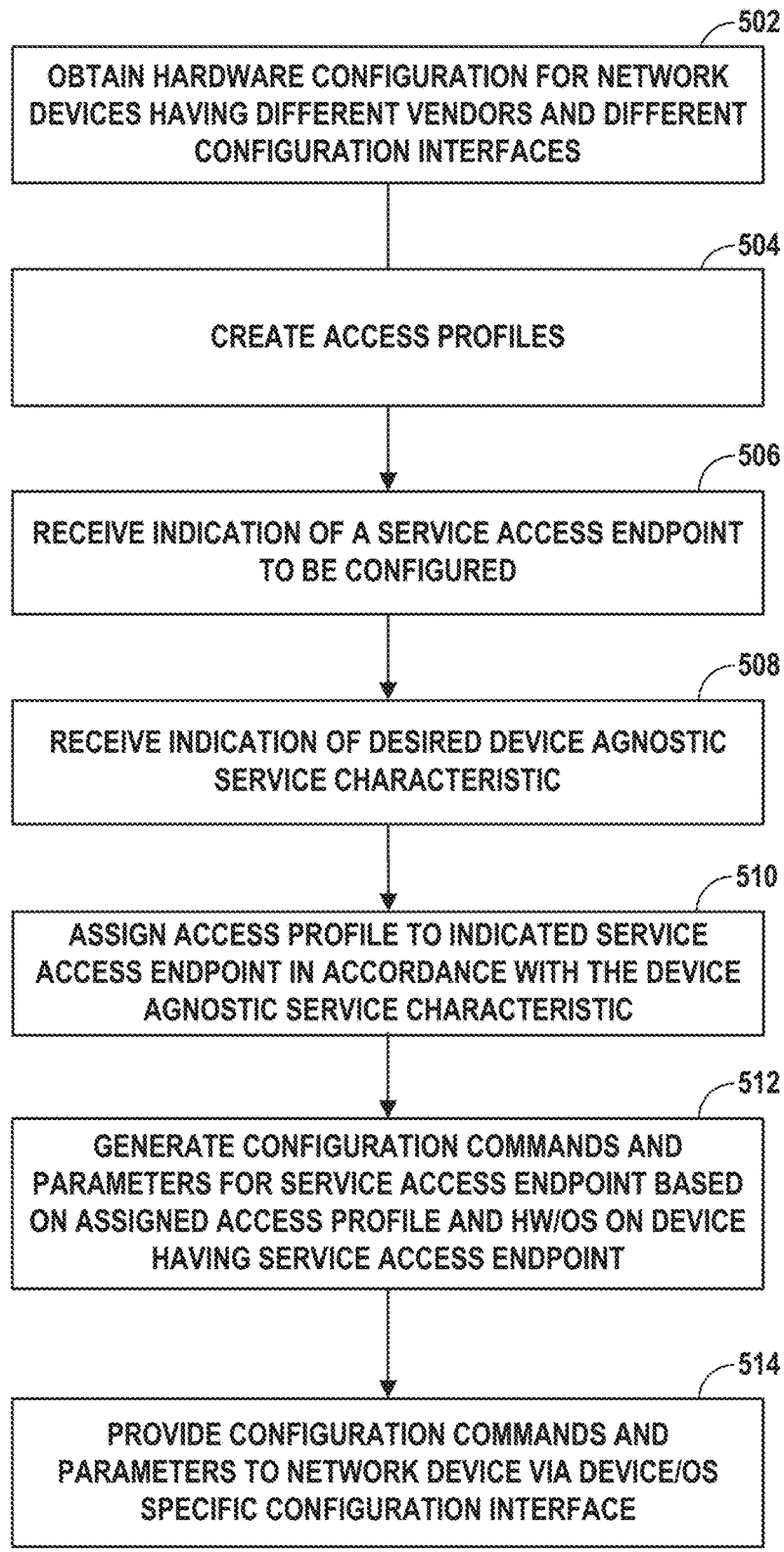
FIG. 5 is a flowchart illustrating a method for device agnostic modeling of service access endpoints in accordance with techniques described herein.

FIG. 5 is a flowchart illustrating a method for vendor agnostic, device agnostic, and network OS agnostic modeling of service access endpoints in accordance with techniques described herein. In some aspects, the operations may be performed upon the initial configuration of network devices in a new data center. In further aspects, the operations may be performed when a new network device is added to a data center. In still further aspects, the operations may be performed when a network device is reconfigured.

In some aspects, hardware configuration information may be obtained for network devices, for example, network devices in a data center (502). The network devices in a data center may have been manufactured by various vendors and may execute various operating systems. As discussed above, the network devices may have a variety of different configuration interfaces based on the vendor supplying the network device, the model of the network device, the version of the network device etc. In some aspects, the hardware configuration information can be obtained through one or more discovery processes. For example, discovery operations may be initiated by various workflows when a data center is initially configured. In some aspects, the workflows can cause a fabric management server to automatically obtain hardware configuration information from devices on a fabric management network. For example, workflows may utilize IPMI or other discovery techniques to obtain hardware configuration information from switches and servers on a network. The information obtained may be combined with other information that may be provided by a system administrator such as VLANs, subnets, loopbacks, Autonomous System Numbers (ASNs) etc. that are to be configured in the data center network. The fabric management server can store this information as part of the hardware configuration information 146 in a configuration data base 142 for the data center network.

In some aspects, a system administrator or other user can create access profiles (504). An access profile can include data that defines desired characteristics for a service access end point in a vendor agnostic, device agnostic, and/or network OS agnostic manner. In other words, the characteristics can be defined such that the characteristics are not necessarily tied to any particular vendor's, device's or network operating system's scheme for defining characteristics. In some aspects, the access profile can define characteristics that specify a desired CoS, QoS, and/or network storm/flooding prevention characteristics. For example, a user may set one or more of attributes of an access profile to specify to what extent, what CoS marking and shaping should be applied to the traffic generated at an access endpoint. Further, a user may set one or more attributes of an access profile to specify how network storms or network flooding situations are to be handled. For example, the user may specify how to limit Broadcast, Unknown Unicast, Multicast (BUM) traffic in order to prevent network flooding or storms. The user may set one or more attributes that specify thresholds in terms of a bit rate or packet rate. In some aspects, the user may set independent thresholds for broadcast rate, multicast rate and unknown unicast rate. The user may set other attributes in an access profile that may be used to specify or define other desired service access endpoint characteristics.

A configuration generator can receive an indication of a service access point that is to be configured (506). For example, a system administrator or other user may utilize a UI device 129 (FIG. 1) to select one or more service access points that are to be configured. In some aspects, the system administrator can designate a particular port or line card on a switch or server that is to be configured. In some aspects, a user can select a particular VLAN that is to be configured. The service access points that are part of the VLAN can be indicated to the configuration generator as service access points to be configured. Other groupings such as port groups may also be selected by the system administrator to indicate which service access points are to be configured.

The configuration generator can receive an indication of a desired device agnostic service characteristic that is to be used to configure the indicated service access points (508). For example, a system administrator can specify a desired device agnostic service characteristic and either determine an existing access profile that has device agnostic attributes that correspond to the desired characteristic or can create an access profile with device agnostic attributes that specify the desired characteristic. The configuration generator can receive a desired CoS, QoS, or broadcast storm/flooding control characteristic. The system can assign an access profile to the indicated service access points based on the indicated device agnostic service characteristic (510).

For each indicated service access point, the configuration generator can generate device specific configuration commands and configuration data (e.g., configuration parameters) based on the hardware configuration (as determined at 502) of the network device that hosts the indicated service access point and the access profile associated with the service access point (512). In some aspects, the configuration generator can use the hardware configuration information associated with the network device hosting the service access point to determine a device specific API to use to generate the configuration commands and data that conform to the device specific API. The configuration generator can also use device agnostic attributes from the access profile associated with the indicated service access point to generate the configuration commands and data. For example, the configuration generator can translate the device agnostic attribute values into configuration commands and data that comply with the vendor specific and/or network OS specific configuration API supported by the network device hosting the indicated service access point.

The configuration generator can then provide the generated vendor specific configuration commands and data to the network device hosting the indicated service access point using the vendor specific configuration API (514).

As will be appreciated from the above, a configuration generator can transform device and network OS agnostic service access point characteristics into vendor and network OS specific configuration commands and data. A technical problem with conventional systems is that the user typically must utilize different vendor specific configuration APIs based on vendors of network devices and the network OSs executing on the network devices. This lack of uniformity in configuration APIs can leading to an increased potential for misconfiguration and erroneous network operation. Thus, the techniques described herein can provide a technical solution to this technical problem in the form of a uniform and vendor agnostic way to configure service access points on different network devices.

The techniques described herein may be implemented in hardware, software, firmware, or any combination thereof. Various features described as modules, engines, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A method comprising:
obtaining hardware configuration information for each of a plurality of network devices;
receiving an indication of a selection of a service access point of a first network device of the plurality of network devices;
receiving an indication of a selection of a device agnostic service characteristic, the device agnostic service characteristic comprising a Class of Service (CoS) marking characteristic or a CoS shaping characteristic;
associating an access profile with the selected service access point in accordance with the device agnostic service characteristic, the access profile having one or more device agnostic attributes defining the selected device agnostic service characteristic; and
determining, based at least in part on the one or more device agnostic attributes of the access profile associated with the selected service access point, one or more device specific configuration commands and configuration parameters that conform with a first configuration interface of the first network device.

2. The method of claim 1, further comprising:
providing the one or more device specific configuration commands and configuration parameters to the first network device via the first configuration interface.

3. The method of claim 2,
wherein a second network device has a second configuration interface different from the first configuration interface;
wherein the second network device belongs to a same network group as the first network device;
wherein the access profile is associated with a second service access point hosted by the second network device;
wherein the method further comprises:
determining, based at least in part on the one or more device agnostic attributes of the access profile associated with the second service access point, one or more device specific configuration commands and configuration parameters that conform with the second configuration interface.

4. The method of claim 3, wherein the one or more attributes defining the device agnostic service characteristic are agnostic with respect to a first network operating system executable by the first network device and agnostic with respect to a second network operating system executed by the second network device, wherein the first network operating system is different from the second network operating system.

5. The method of claim 3, wherein the one or more attributes defining the device agnostic service characteristic are agnostic with respect to a first vendor of the first network device and agnostic with respect to a second vendor of the second network device, wherein the first vendor is different from the second vendor.

6. The method of claim 1, wherein the one or more attributes defining the device agnostic service characteristic comprise one or more device agnostic class-of-service parameters and the one or more device specific configuration commands and configuration parameters comprise device specific class-of-service configuration commands and parameters.

7. The method of claim 1, wherein the one or more attributes defining the device agnostic service characteristic comprise one or more device agnostic storm control parameters and the one or more device specific configuration commands and configuration parameters comprise one or more device specific storm control configuration commands and configuration parameters.

8. The method of claim 1, wherein the first network device comprises a virtual device.

9. A Software Defined Network (SDN) controller comprising:
one or more processors coupled to a memory, the memory including executable instructions to cause the one or more processors to:
obtain hardware configuration information for each of a plurality of network devices on a network controlled in part by the SDN controller;
receive an indication of a selection of a service access point of a first network device of the plurality of network devices;
receive an indication of a selection of a device agnostic service characteristic, the device agnostic service characteristic comprising a Class of Service (CoS) marking characteristic or a CoS shaping characteristic;
associate an access profile with the selected service access point in accordance with the device agnostic service characteristic, the access profile having one or more device agnostic attributes defining the selected device agnostic service characteristic; and
determine, based at least in part on the one or more device agnostic attributes of the access profile associated with the selected service access point, one or more device specific configuration commands and configuration parameters that conform with a first configuration interface of the first network device.

10. The SDN controller of claim 9, wherein the instructions further comprise instructions to:
provide the one or more device specific configuration commands and configuration parameters to the first network device via the first configuration interface.

11. The SDN controller of claim 10,
wherein a second network device has a second configuration interface different from the first configuration interface;
wherein the access profile is associated with a second service access point hosted by the second network device;
wherein the instructions further comprise instructions to:
determine, based at least in part on the one or more device agnostic attributes of the access profile associated with the second service access point, one or more device specific configuration commands and configuration parameters that conform with the second configuration interface.

12. The SDN controller of claim 11, wherein the one or more attributes defining the device agnostic service characteristic are agnostic with respect to a first network operating system executable by the first network device and agnostic with respect to a second network operating system executed by the second network device, wherein the first network operating system is different from the second network operating system.

13. The SDN controller of claim 11, wherein the one or more attributes defining the device agnostic service characteristic are agnostic with respect to a first vendor of the first network device and agnostic with respect to a second vendor of the second network device, wherein the first vendor is different from the second vendor.

14. The SDN controller of claim 11, wherein the first network device is a same type as the second network device, and wherein the one or more attributes defining the device agnostic service characteristic are agnostic with respect to a first chipset on the first network device and agnostic with respect to a second chipset of the second network device, wherein the first chipset is different from the second chipset.

15. The SDN controller of claim 9, wherein the one or more attributes defining the device agnostic service characteristic comprise one or more device agnostic class-of-service parameters and the one or more device specific configuration commands and configuration parameters comprise device specific class-of-service configuration commands and configuration parameters.

16. The SDN controller of claim 9, wherein the one or more attributes defining the device agnostic service characteristic comprise one or more device agnostic storm control parameters and the one or more device specific configuration commands and configuration parameters comprise one or more device specific storm control configuration commands and configuration parameters.

17. The SDN controller of claim 9, wherein the first network device comprises a virtual device.

18. The SDN controller of claim 9, wherein the access profile comprises a plurality of device agnostic service characteristics representing a plurality of device specific characteristics provided by the plurality of network devices.

19. A non-transitory computer-readable medium comprising instructions for causing one or more programmable processors to:
   obtain hardware configuration information for each of a plurality of network devices on a network controlled in part by the SDN controller;
   receive an indication of a selection of a service access point of a first network device of the plurality of network devices;
   receive an indication of a selection of a device agnostic service characteristic, the device agnostic service characteristic comprising a Class of Service (CoS) marking characteristic or a CoS shaping characteristic;
   associate an access profile with the selected service access point in accordance with the device agnostic service characteristic, the access profile having one or more device agnostic attributes defining the selected device agnostic service characteristic;
   determine, based at least in part on the one or more device agnostic attributes of the access profile associated with the selected service access point, one or more device specific configuration commands and configuration parameters that conform with a first configuration interface of the first network device; and
   provide the one or more device specific configuration commands and configuration parameters to the first network device via the first configuration interface.

20. The non-transitory computer-readable medium of claim 19,
   wherein a second network device has a second configuration interface different from the first configuration interface;
   wherein the access profile is associated with a second service access point hosted by the second network device;
   wherein the instructions further comprise instructions to:
      determine, based at least in part on the one or more device agnostic attributes of the access profile associated with the second service access point, one or more device specific configuration commands and configuration parameters that conform with the second configuration interface.

* * * * *